(12) United States Patent
Klimis et al.

(10) Patent No.: US 10,130,236 B2
(45) Date of Patent: Nov. 20, 2018

(54) MICROFIBRE-BASED CLEANING SPONGE

(71) Applicant: EURVEST, Nivelles (BE)

(72) Inventors: Jean Klimis, Nivelles (BE); Pierre Klimis, Ohain (BE)

(73) Assignee: EURVEST, Nivelles (BE)

( * ) Notice: Subject to any disclaimer, the term of this patent is extended or adjusted under 35 U.S.C. 154(b) by 28 days.

(21) Appl. No.: 15/102,162

(22) PCT Filed: Dec. 5, 2014

(86) PCT No.: PCT/EP2014/076801
§ 371 (c)(1),
(2) Date: Jun. 6, 2016

(87) PCT Pub. No.: WO2015/082715
PCT Pub. Date: Jun. 11, 2015

(65) Prior Publication Data
US 2016/0296095 A1    Oct. 13, 2016

(30) Foreign Application Priority Data
Dec. 6, 2013  (FR) ..................................... 13 62238

(51) Int. Cl.
| A47L 13/17 | (2006.01) |
| A47L 13/16 | (2006.01) |
| B32B 5/02 | (2006.01) |
| B32B 5/08 | (2006.01) |
| B32B 5/18 | (2006.01) |
| B32B 5/24 | (2006.01) |
| B32B 5/32 | (2006.01) |
| B32B 37/12 | (2006.01) |

(52) U.S. Cl.
CPC ............... *A47L 13/17* (2013.01); *A47L 13/16* (2013.01); *B32B 5/022* (2013.01); *B32B 5/024* (2013.01); *B32B 5/026* (2013.01); *B32B 5/08* (2013.01); *B32B 5/18* (2013.01); *B32B 5/245* (2013.01); *B32B 5/32* (2013.01); *B32B 37/12* (2013.01); *B32B 2260/021* (2013.01); *B32B 2260/046* (2013.01); *B32B 2266/0278* (2013.01); *B32B 2266/06* (2013.01); *B32B 2310/0445* (2013.01); *B32B 2432/00* (2013.01)

(58) Field of Classification Search
CPC .................................. A47L 13/16; A47L 13/17
USPC ........................................................... 442/63
See application file for complete search history.

(56) References Cited

U.S. PATENT DOCUMENTS

| 4,525,411 | A | 6/1985 | Schmidt |
| 2003/0077106 | A1* | 4/2003 | Weihrauch ............. A47L 13/16 401/196 |
| 2011/0239394 | A1 | 10/2011 | Pisacane et al. |

(Continued)

FOREIGN PATENT DOCUMENTS

| DE | 102012009422 | 11/2013 |
| FR | 2958525 | 10/2011 |
| WO | 9749326 | 12/1997 |

*Primary Examiner* — Jennifer C Chiang
*Assistant Examiner* — Bradley Oliver
(74) *Attorney, Agent, or Firm* — Duane Morris LLP; Gregory M. Lefkowitz; Jason M. Nolan

(57) ABSTRACT

The present invention concerns a sponge including a layer of an absorbent material and a layer of a textile material made of microfibers and strengthened by a binding agent, said textile layer at least partially covering one or more of the surfaces of the layer of absorbent material.

19 Claims, 2 Drawing Sheets

(56) References Cited

U.S. PATENT DOCUMENTS

2014/0317866 A1\* 10/2014 Burt .................. A47K 7/02
                                              15/210.1
2015/0096595 A1   4/2015 Eurvest \* cited by examiner

MICROFIBRE-BASED CLEANING SPONGE

CROSS-REFERENCE TO RELATED APPLICATIONS

This application is a § 371 national stage entry of International Application No. PCT/EP2014/076801, filed Dec. 5, 2014, which claims priority to French Patent Application No. 1362238, filed Dec. 6, 2013, the entire contents of which is incorporated herein by reference.

TECHNICAL FIELD

This invention relates to the field of cleaning products. More particularly, this invention relates to a sponge intended to be used to clean and wipe household surfaces or to be used on crockery.

TECHNICAL BACKGROUND OF THE INVENTION

Sponges are known to be used to clean and wipe crockery. Typically, these sponges have an absorbent portion made from a synthetic or plant material capable of absorbing liquids inside the sponge on which is assembled an abrasive layer intended to scrub the crockery.

However, these are the same sponges generally used in households to wipe damp surfaces. Yet these sponges, although they are able to absorb liquids, nonetheless have poor wiping properties and can leave behind traces of water on the surfaces treated.

Cleaning cloths made from woven microfibres exist, providing improved wiping properties, and more particularly for wiping grease. However, these cloths are thin and are capable of fraying, which reduces their product life or the type of surface on which they are used. On the other hand, they have a lesser liquid retention capacity compared to a sponge.

A first known solution consists in applying a layer of microfibres on absorbent sponges to increase the wiping power of conventional sponges. This is particularly the case for the products described in documents US-A-2011/0239394 and FR-A-2 915 075. Other triple-layered sponges including a layer of microfibres are also known in document FR-A-2 958 525. Similarly, documents WO 97/49326 and U.S. Pat. No. 4,525,411 describe sponges on which a textile microfibre layer is bonded using an adhesive.

However, it is not easy to use microfibre materials in conventional sponge manufacturing methods, which generally consist of assembling sheets with each other in the form of an assembly which is then cut to the dimensions of the sponge.

Indeed, the microfibre materials demonstrate a strong tendency to become deformed and come apart when cut. This is particularly why microfibre cloths are generally equipped with sewn edges to prevent the material from fraying. Document US-A-2011/0239394 highlights this problem while proposing to chamfer the sponge edges so as to reduce degradation of the microfibre layer.

SUMMARY OF THE INVENTION

This invention is designed to overcome the disadvantages of the prior art by providing a sponge that is easy to manufacture, having an excellent wiping capacity and excellent mechanical strength. Moreover, this invention aims to combine all of the advantages of microfibre-based textiles and absorbent materials to obtain a product with both a high liquid retention capacity and optimal wiping performance.

A first aspect of the invention relates to a sponge including a layer of an absorbent material and a layer of a textile material made at least partially of microfibres and strengthened by a binding agent, said textile layer at least partially covering one or more of the surfaces of the layer of absorbent material.

According to one embodiment of the invention, the surface of the layer of absorbent material opposite that covered by the strengthened microfibre material is covered by a layer comprising a choice of: an abrasive material, a cellulosic sponge material, a cellulosic fabric, a polyurethane foam, a hydrophilic material, a hydrophilic polyurethane foam, a cellular open-pore material, a vinyl acetate polymer, a textile material, a microfibre-based textile material identical or different to that used on the opposite side, and preferably an abrasive material.

According to one embodiment of the invention, the microfibre-based strengthened textile material covers the whole surface of the hydrophilic absorbing layer on which it is assembled.

According to one embodiment of the invention, the sponge edge is not chamfered and the layer of microfibre-based strengthened material has a straight edge aligned on the edge of the layer of the absorbent material.

According to one embodiment of the invention, the microfibres of the microfibre-based textile material are woven, non-woven or knitted, preferably knitted or woven, possibly in the form of a weft-knitted terry.

According to one embodiment of the invention, the binding agent is a polymer, preferably polyurethane.

According to one embodiment of the invention, the microfibres are made from polyester, polyamide and preferably a mixture of polyester and polyamide.

According to one embodiment of the invention, the layer of strengthened microfibre material has a thickness of between 0.3 and 4 mm, preferably between 0.8 and 2 mm and more preferably between 1.2 and 1.6 mm, and the absorbing layer has a thickness of between 1.0 and 5.0 cm, preferably between 1.5 and 3.5 cm, and more preferably between 1.7 and 2.5 cm.

According to one embodiment of the invention, the weight ratio of microfibres/binding agent is between 9.5:0.5 and 5:5, preferably between 9:1 and 7:3 and more preferably between 8.2:1.8 and 7.3:2.7.

According to one embodiment of the invention, the layer of microfibre material has a grammage of between 250 and 400 $g/m^2$, preferably between 300 and 360 $g/m^2$.

Another aspect of this invention relates to a method for manufacturing a sponge according to any one of the previous claims, comprising the steps of (i) assembly by bonding or buckling of a layer of microfibre-based textile material strengthened by a binding agent on a layer of an absorbent material, (ii) optional assembly by bonding or buckling of a third layer comprising a choice of a cellulosic sponge material, a cellulosic fabric, a polyurethane foam, a hydrophilic material, a hydrophilic polyurethane foam, a cellular open-pore material, a vinyl acetate polymer, a textile material, a microfibre-based textile material identical or different to the first microfibre layer, preferably a layer of abrasive material and (iii) cutting of the assembly thus obtained into the shape of a sponge, for example using a saw, cutter or water jet.

According to one embodiment of the invention, the microfibre-based textile material is strengthened via the impregnation of the layer in a polymer solution that is polymerised by a coagulating agent.

Another aspect of this invention relates to the use of a microfibre-based textile material strengthened by a binding agent such as a polymer for manufacturing a wiping surface of a sponge.

DETAILED DESCRIPTION OF THE INVENTION

According to this invention, the term "sponge" is understood as an absorbent, porous and/or fibrous, natural or synthetic material used to clean surfaces or crockery. A sponge is generally rectangular in shape and has two main surfaces and four side surfaces. The surfaces referred to as the "main" surfaces have the greatest contact surface areas of all of the surfaces of the sponge. The term "sponge" describes an item capable of being directly handled by the user and is distinguishable from fabrics.

Figure 1:
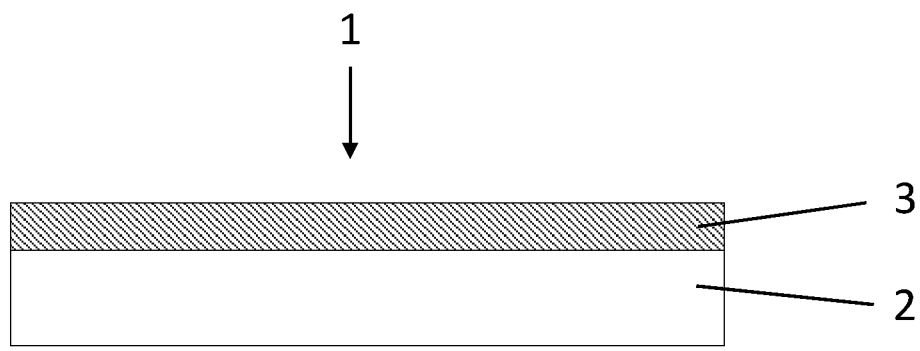
FIG. 1 provides a side view of a sponge having a layer of an absorbent material and a layer of microfibre-based strengthened textile material, in accordance with some embodiments.
Figure 2:
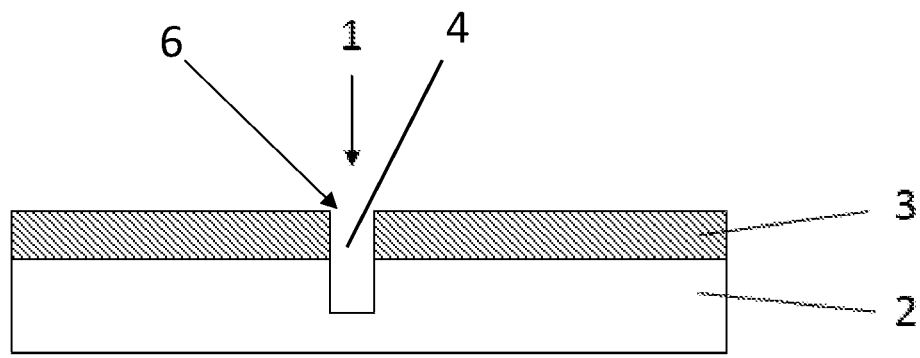
FIG. 2 is a side view of the sponge having cavity 4, in accordance with some embodiments.
Figure 3:
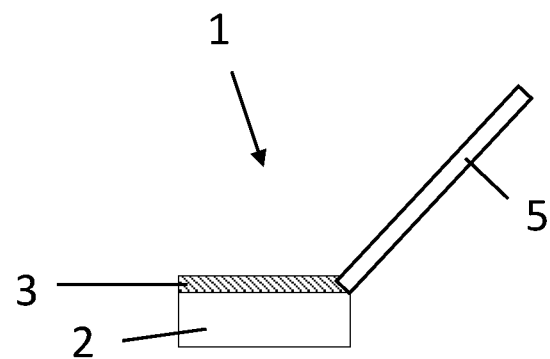
FIG. 3 is a side view of the sponge having reservoir sleeve 5, in accordance with some embodiments.

As shown in FIG. 1, sponge 1 according to the invention includes a first layer of an absorbent material 2. This can be flexible and porous.

The materials used in the sponges are known by one of ordinary skill in the art. Typically, cellulosic materials, cellulosic fabrics, polyurethane foams, cellular open-pore materials, hydrophilic cellular materials, cellular materials with a vinyl acetate polymer base, or melamine materials can be used.

Vegetable sponges (or cellulosic sponges) are made by the regeneration of cellulose fibres, which play a role in the improved absorption of liquid inside the sponge. Prior to the cellulose regeneration, salt granules are incorporated into the material, which melt and dissolve during the manufacturing process, thus generating a porous structure characteristic of sponges and contributing to its absorbing power.

Synthetic foams can be prepared, for example polyurethane foams obtained by the chemical combination of reagents, mainly an isocyanate and a polyol. The chemical nature of the polyurethane foams is mainly defined by the polyol used. Therefore, conventional, hydrophobic polyurethane foams often have a hydrophobic polyol base, such as propylene-based polyols. Inversely, by using hydrophilic polyols such as glycol polyethylene, a hydrophilic polyurethane can be obtained.

In one particularly advantageous version of the invention, a hydrophilic sponge is used. A "hydrophilic" sponge or foam us understood in this text and in the claims as referring to a sponge or foam having a capillary absorption rate after 15 seconds of greater than 0.10 $g/cm^2$, preferably greater than 0.50 $g/cm^2$ for a thickness of 20 mm.

Typically, the absorbing layer of a synthetic sponge has a density (mass over volume) of between 18 and 40 $kg/m^3$ and preferably between 20 and 30 $kg/m^3$. It can be adapted to suit the considered uses. A too low density can result in the insufficient retention of liquid, whereas a too high density can affect its flexibility and cost.

The porous structure of the sponges is such that it encourages the absorption of liquids via capillarity. This capillary power dries damp surfaces with varying effectiveness, as the pores of the sponge can become filled with water, but are also capable of releasing water when subjected to a given amount of pressure. Typically, the size of the pores of synthetic or cellulosic sponges is about several tens of millimeters, or even several millimeters. For this reason, the wiping performance of a sponge is imperfect and liquid traces generally remain visible on the wiped surface after passing the sponge.

The sponges according to this invention further include a layer of microfibre-based strengthened textile material 3 (FIG. 1). The term "microfibre-based" does not rule out the presence of other components in the textile material, however entails at least the presence of microfibres. Microfibres can be nonwoven, woven or knitted. According to a particular embodiment of the invention, the microfibres are woven or knitted and can form a weft-knitted terry on the surface of the textile.

Microfibre-based textiles are renowned by one of ordinary skill in the art for their absorbent power. Indeed, the thinner the fibres, the smaller the spaces between each fibre and the greater the capillary absorption power. Moreover, the narrowness of the inter-capillary spaces provides the textile with improved water retention capacities and therefore reduces the liquid traces deposited on the wiped surface.

The microfibre textile materials used for sponges and cloths are generally woven, nonwoven or knitted and are therefore assembled such that they tend to come apart at the edges and sections. The adhesive conventionally used to assemble the textile layer and the sponge layer does not solve this problem as it only covers one surface of the textile sheet in a superficial manner.

The binding agent corresponds to a treatment agent that conditions the microfibre-based textile by strengthening the fibres between each other. Typically, the microfibre treatment takes place during the sponge manufacturing method at a step that is independent from that of bonding the material to a substrate.

This invention overcomes this disadvantage and eases the use of microfibre-based materials in sponge manufacturing methods. It was discovered in a surprising manner, that by the prior treatment of microfibre-based textiles, the latter could be secured to each other in the form of a strengthened layer. These layers or sheets therefore have improved strength and mechanical properties compared to known microfibre-based textile materials and appear particularly useful for sponge-type cleaning products. The strengthening of the microfibre-based materials within the scope of this invention results in the microfibres being secured throughout the whole material and not only at its surface. Typically, the microfibres are secured in a homogeneous manner throughout the material of the textile layer.

The treatment consists in adding a binding agent to the microfibre-based textile, which secures the fibres together. Typically, this step can take place via impregnation by solubilising or suspending a binding polymer in a solvent and by passing an intermediate microfibre textile sheet into said solution or suspension. The binding agent is then polymerised by physical, heat or chemical treatment, for example with a coagulating agent known in the field.

A nonwoven textile layer can also be used, containing a mixture of microfibres and heat-fusible fibres (which melt at a relatively low temperature). The additional fibres are thus melted by heat treatment and contribute to securing the microfibres together and strengthening the textile layer after cooling. Other methods accessible to one of ordinary skill in the art can also be considered, such as vaporising a binding agent on the sheet.

Moreover, the use of an impregnation method is possible and advantageous, wherein the coagulation reaction of the binding agent is accompanied by a gaseous emission, which encourages the formation of pores in the impregnation polymer. The incorporation of fine inert salt particles into the impregnation solution is also possible and advantageous, wherein the particles are ultimately evacuated by washing and contribute to producing a porous structure in the coagulated polymer. One particularly preferred polymer for strengthening the microfibre layers is polyurethane.

The microfibre textiles used in the materials of this invention are known by one of ordinary skill in the art and can be produced in a conventional manner with microfibres made from polyamide, polyester or their copolymers.

Typically, the weight ratios between the microfibre-based textile and the polymer in the impregnated sheets is between 9.5:0.5 and 5:5, preferably between 9:1 and 7:3 and more preferably between 8.2:1.8 and 7.3:2.7.

The microfibre-based materials thus obtained are therefore useful in the manufacture of sponges. Typically, the textile layers are assembled on at least one of the surfaces of an absorbing layer, for example by bonding or buckling. The strengthened microfibre materials can therefore partially cover or completely cover the surface of the side of the absorbing layer on which it is placed.

The assemblies thus obtained can then be cut, for example using a circular, oscillating or band saw, a cutter or potentially a water jet, in the shape of sponges without requiring overly chamfering or treating the edges of the sponge to prevent the microfibre wiping layer from fraying. This is even more advantageous as the mechanical stresses exerted on a sponge are high when scrubbing or scouring crockery.

The sponges of this invention are dimensioned as described below. The microfibre layer has a typical thickness of between 0.3 and 4 mm, preferably between 0.8 and 2 mm and more preferably between 1.2 and 1.6 mm. Thanks to this invention, the thickness of the wiping layer and that of the whole sponge can be reduced, without affecting the mechanical properties of the sponge. The absorbing porous layer has a standard thickness of between 1.0 and 5.0 cm, preferably between 1.5 and 3.5 cm and more preferably between 1.7 and 2.5 cm.

It appears that microfibres, even though they are treated, due to their very thin structure and their number, have a high wiping and absorbing power that is particularly useful for multi-purpose sponges. They are in particular used to capture all types of dirt or grease, as well as absorb liquids, water, oil or detergents.

It also appears that the strengthening of the microfibre-based materials improves the wiping power of the sponges compared to conventional microfibre-based sponges. Without being bound by a theory of any kind, this effect would be caused by the smoothing of the wiping surface by the binding polymer. The rinsing capacity of the sponge is thus also improved as the dirt is removed more easily from the surface when the sponge is rinsed.

The use of a binding agent also increases the mechanical strength of conventional sponges, as the treatment polymer affects the cohesion of the microfibres and the general strength of the sponge.

The object of this invention is particularly advantageous for more complex sponges, such as those described in the patent application WO 2013/167304, the contents of which are incorporated by reference. Indeed, for this type of sponge, one or more surfaces are made fragile by the presence of at least one cavity separate from the pores of the sponge, adapted to allow a liquid to be introduced inside the sponge.

The binding agent therefore increases the mechanical strength of this type of sponge and reduces the tendency of the microfibre layer to fray during handling at the edge of each orifice present on said layer.

Therefore, this invention further relates to a sponge including at least one cavity 4, separate from the pores of the sponge, adapted to allow a liquid to be introduced inside the sponge to impregnate the sponge, for example on one side or one surface of the sponge, all sides of which clean and/or generate foam. Preferably, the cavity 4 has a bottom inside the sponge, and opens out on the other hand onto a surface of the sponge by forming an orifice 6, such that the maximum distance between two points of the contour of the orifice 6 is between 3, preferably 5, more preferably 8, and 25, preferably 20, more preferably 15 mm or even more preferably 12 mm. Said orifice 6 has a typical surface area of between 5 and 200 mm$^2$, preferably between 20 and 120 mm$^2$ and more preferably between 50 and 120 mm$^2$ or even more preferably between 50 and 100 mm$^2$. The contour of the orifice 6 can have a circular, oval or rectangular shape.

According to another embodiment of the invention, the sponge according to the invention further comprises a second layer bonded on at least one portion of the lower surface of the sponge. If the sponge comprises multiple layers, each of which potentially performs a different function, the second layer is made from an abrasive material and the third layer is made from a microfibre-based material. The orifice 6 of the sponge is therefore located on the third layer and the cavity 4 passes through said third layer.

Another aspect of the invention relates to a cleaning method wherein the user refills the sponge with a cleaning liquid during the cleaning phase, for example under running water. To refill the sponge, the user inserts the tip of the bottle containing the cleaning product directly into the orifice 6 of the sponge. The liquid cleaner is a degreasing liquid or a washing up liquid, preferably a washing up liquid.

Furthermore, in one preferred execution of the invention, the binding agent proves to be a polymer that can itself also have an intrinsic porosity, which increases the capillary drying power for drying the surfaces when passing the sponge. This is particularly true when polyurethane is used as a binding agent. Such properties have been demonstrated through tests measuring the absorption power of oil, as shown in the protocol provided in the example.

One particularly preferred embodiment of the invention concerns a triple-layer sponge, i.e. a sponge comprising an additional layer offering various functions. The layer of absorbent material typically comprises an additional layer on the opposite side to that receiving the strengthened microfibre material. This additional layer can be an abrasive layer or another layer selected from the group of materials consisting of:

a cellulosic sponge material,
a cellulosic fabric,
a polyurethane foam,
a hydrophilic material,
a hydrophilic polyurethane foam,
a cellular open-pore material,
a vinyl acetate polymer,
a textile material,
a microfibre-based textile material identical or different to that used for the first layer.

The abrasive layer is typically made using a nonwoven sheet impregnated with a thermosetting resin including, for example, abrasive fillers. These abrasive fillers can be made from iron filings, quartz, corundum, recycled glass, talc particles or fine grains of plastic material.

EXAMPLES

Example 1

The following sponges were tested in order to test their grease-wiping properties.

1. Sponge according to the invention (comprising a layer of microfibres strengthened by polyurethane+layer of synthetic foam of 22 kg/m$^3$)
2. Synthetic sponge of 22 kg/m$^3$ Two series of tests were performed. For each series, a greasy liquid (vegetable oil dyed red) was used.

In a first series of tests, two droplets of diameter+/−4 cm were placed then wiped using each of the two sponges in 3 forward-backward movements. The results show that the sponge according to the invention effectively removes all red traces of the greasy liquid whereas the other conventional sponge does not fully remove these traces.

In a second series of tests, a recipient was filled with the greasy liquid to a height of 6 mm. The sponges to be tested, having similar dimensions, were then placed vertically in the recipient on their side for several minutes. The results show a level of liquid absorption within the sponge of the invention that is greater than that obtained for the synthetic sponge.

Example 2

Two sponges, one synthetic and the other cellulosic, without any microfibre textile layer, were compared to a sponge according to the invention with regard to their resistance to abrasion. The test was conducted on a Branca rotary abrasion tester at a pressure of 250 g/cm$^2$ by friction against a fibreglass grating covered in Teflon. After 500 and 800 rotations, the first two sponges had become totally degraded, whereas the sponge according to the invention was only mildly degraded after 4000 rotations. The mechanical properties of the sponges according to the invention are therefore considerably improved in relation to known sponges.

The invention claimed is:

1. Sponge comprising a layer of an absorbent material and a layer of a textile material made of microfibres and strengthened by a binding agent, the weight ratio of microfibres/binding agent in the textile layer being between 9.5:0.5 and 5:5, said textile layer at least partially covering one or more of the surfaces of the layer of absorbent material.

2. Sponge according to claim 1, wherein the surface of the layer of absorbent material opposite that covered by the strengthened microfibre material is covered by a layer comprising a choice of: an abrasive material, a cellulosic sponge material, a cellulosic fabric, a polyurethane foam, a hydrophilic material, a hydrophilic polyurethane foam, a cellular open-pore material, a vinyl acetate polymer, a textile material, a microfibre-based textile material identical or different to that used on the opposite side.

3. Sponge according to claim 1, wherein the microfibre-based strengthened textile material covers the whole surface of the hydrophilic absorbing layer on which it is assembled.

4. Sponge according to claim 1, wherein the sponge edge is not chamfered and the layer of microfibre-based strengthened material has a straight edge aligned on the edge of the layer of the absorbent material.

5. Sponge according to claim 1, wherein the microfibres of the microfibre-based textile material are woven, nonwoven or knitted.

6. Sponge according to claim 1, wherein the binding agent is a polymer.

7. Sponge according to claim 1, wherein the microfibres are made from a material selected from the group consisting of polyester, and polyamide.

8. Sponge according to claim 1, wherein the layer of strengthened microfibre material has a thickness of between 0.3 and 4 mm, and the absorbing layer has a thickness of between 1.0 and 5.0 cm.

9. Sponge according to claim 1, wherein the layer of microfibre material has a grammage of between 250 and 400 g/m$^2$.

10. Sponge according to claim 1, further comprising at least one cavity, separate from the pores of the sponge, adapted to allow a liquid to be introduced inside the sponge to impregnate the sponge, the cavity having a bottom inside the sponge, and opening out on the other hand onto a surface of the sponge by forming an orifice, such that the maximum distance between two points of the contour of the orifice is between 3 and 25 mm.

11. Sponge according to claim 1, wherein the sponge is devoid of a reservoir sleeve.

12. Sponge according to claim 10, wherein the orifice has a surface area of between 5 and 200 mm$^2$.

13. Sponge according to claim 10, wherein the contour of the orifice has a circular, oval or rectangular shape.

14. Sponge according to claim 10, wherein the cavity is obtained by removing material from the sponge.

15. Sponge according to claim 10, wherein the sponge is adapted such that it can be refilled with a cleaning liquid inside said sponge during the cleaning phase by introducing the tip of a bottle containing the cleaning liquid into the orifice.

16. Method for manufacturing a sponge according to claim 1, comprising the steps of (i) assembly by bonding or buckling of a layer of microfibre-based textile material strengthened by a binding agent on a layer of an absorbent material, (ii) optional assembly by bonding or buckling of a third layer comprising a choice of a cellulosic sponge material, a cellulosic fabric, a polyurethane foam, a hydrophilic material, a hydrophilic polyurethane foam, a cellular open-pore material, a vinyl acetate polymer, a textile material, a microfibre-based textile material identical or different to that used on the opposite side of the opposite layer and (iii) cutting of the assembly thus obtained into the shape of a sponge.

17. Method according to claim 16, wherein the microfibre-based textile material is strengthened via the impregnation of the layer in a polymer solution that is polymerised by a coagulating agent.

18. Method of manufacturing a wiping surface of a sponge, comprising a step of:
    incorporating a microfibre-based textile material strengthened by a binding agent into the wiping surface, the weight ratio of microfibres/binding agent in the textile material being between 9.5:0.5 and 5:5.

19. Sponge according to claim 1, further comprising a reservoir sleeve.

* * * * *